US010635624B2

(12) United States Patent
Kadgi

(10) Patent No.: US 10,635,624 B2
(45) Date of Patent: Apr. 28, 2020

(54) DUAL ROLE CAPABLE CONNECTORS FOR SEPARABLE PORTION OF COMPUTING APPARATUS

(71) Applicant: INTEL CORPORATION, Santa Clara, CA (US)

(72) Inventor: Vijaykumar Kadgi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/305,852

(22) PCT Filed: Jun. 24, 2016

(86) PCT No.: PCT/US2016/039233
§ 371 (c)(1),
(2) Date: Nov. 29, 2018

(87) PCT Pub. No.: WO2017/222552
PCT Pub. Date: Dec. 28, 2017

(65) Prior Publication Data
US 2019/0121771 A1    Apr. 25, 2019

(51) Int. Cl.
*G06F 13/40*    (2006.01)
*G06F 1/16*    (2006.01)
(Continued)

(52) U.S. Cl.
CPC ........ *G06F 13/4022* (2013.01); *G06F 1/1654* (2013.01); *G06F 1/1683* (2013.01);
(Continued)

(58) Field of Classification Search
CPC .. G06F 13/4022; G06F 1/1654; G06F 1/1683; G06F 1/26; G06F 13/40; G06F 13/409; G06F 13/4282
See application file for complete search history.

(56) References Cited

U.S. PATENT DOCUMENTS

2015/0331826 A1\* 11/2015 Ghosh ................. G06F 13/4022
710/313
2016/0062924 A1\* 3/2016 Lee ....................... G06F 13/102
(Continued)

*Primary Examiner* — Tim T Vo
*Assistant Examiner* — Phong H Dang
(74) *Attorney, Agent, or Firm* — Womble Bond Dickinson (US) LLP

(57) ABSTRACT

Embodiments are generally directed to dual role capable connectors for a separable portion of a computing apparatus. An embodiment of an apparatus includes a separable physical connection to a second apparatus; a first electronic connector, the first electronic connector providing data connections for the physical connection; a plurality of additional electronic connectors, the plurality of additional connectors being supported by the first electronic connector; and a control logic to control operation of the plurality of additional electronic connectors, wherein operation of the plurality of additional electronic connectors includes each additional electronic connector being capable to operate in both a host role and a device role for the interconnection of computing systems, wherein the host role and device role may be for a first connector mode or a second connector mode, and an alternative connector mode.

19 Claims, 13 Drawing Sheets

(51) Int. Cl.
　　　*G06F 1/26*　　　(2006.01)
　　　*G06F 13/42*　　(2006.01)
　　　*H01R 24/60*　　(2011.01)

(52) U.S. Cl.
　　　CPC ............... *G06F 1/26* (2013.01); *G06F 13/40* (2013.01); *G06F 13/409* (2013.01); *G06F 13/4282* (2013.01); *G06F 2213/0042* (2013.01); *H01R 24/60* (2013.01)

(56) References Cited

U.S. PATENT DOCUMENTS

| | | | |
|---|---|---|---|
| 2016/0110305 A1* | 4/2016 | Hundal | G06F 13/4022 710/316 |
| 2016/0147704 A1* | 5/2016 | Guillerm | G06F 13/4068 710/106 |
| 2016/0156137 A1* | 6/2016 | Pan | G06F 13/385 439/78 |
| 2016/0253283 A1* | 9/2016 | Bowers | G06F 13/4068 710/305 |
| 2016/0364360 A1* | 12/2016 | Lim | G06F 13/385 |
| 2016/0371213 A1* | 12/2016 | Voto | G06F 13/4022 |
| 2018/0048753 A1* | 2/2018 | Chan | H04L 12/40078 |
| 2018/0060270 A1* | 3/2018 | Schnell | G06F 13/4282 |

* cited by examiner

Receptacle pinout

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBUS | CC1 | D+ | D- | SBU1 | VBUS | RX2- | RX2+ | GND |
| GND | RX1+ | RX1- | VBUS | SBU2 | D- | D+ | CC2 | VBUS | TX2- | TX2+ | GND |
| B12 | B11 | B10 | B9 | B8 | B7 | B6 | B5 | B4 | B3 | B2 | B1 |

| First/Previous Connector Mode | Subsequent Connector Modes Possibility | | | |
|---|---|---|---|---|
| | DP Alternate Mode x4 | DP Alternate Mode x 2 + USB3 | USB Host Mode | USB Device Mode |
| DP Alternate Mode x4 | Yes | No | USB2 | USB2 |
| DP Alternate Mode x 2 + USB3 | No | Yes | USB3 | USB2 |
| USB3 Host Mode | No | Yes | USB3 | USB3 |
| USB2 Host Mode | Yes | Yes | USB3 | USB3 |
| USB3 Device Mode | No | No | USB3 | NO, Only One Connector in Device Role At Any Time |
| USB2 Device Mode | Yes | Yes | USB3 | NO, Only One Connector in Device Role At Any Time |

FIG. 5

DUAL ROLE CAPABLE CONNECTORS FOR SEPARABLE PORTION OF COMPUTING APPARATUS

CROSS-REFERENCE TO RELATED APPLICATIONS

This patent application is a U.S. National Phase application under 35 U.S.C. § 371 of International Application No. PCT/US2016/039233, filed Jun. 24, 2016, entitled "DUAL ROLE CAPABLE CONNECTORS FOR SEPARABLE PORTION OF COMPUTING APPARATUS", the contents of which are incorporated herein by reference.

TECHNICAL FIELD

Embodiments described herein generally relate to the field of electronic devices and, more particularly, dual role capable connectors for a separable portion of a computing apparatus.

BACKGROUND

Detachable systems, in which a computer system may operate either as a notebook or laptop computer when a tablet portion and a keyboard portion are connected together or as a tablet computer when the tablet portion is separated from the keyboard portion, are growing in popularity because of the ability of such systems to provide multiple computing forms in a single package.

The benefits of detachable systems go beyond mere separation of the keyboard from the tablet because the base of the detachable system provides additional functionality, including the presence of multiple connectors (including Universal Serial Bus (USB™) connectors) on the base. The new version of the USB connector is the USC Type-C™ (also referred to as USB-C) utilizing a small form factor connector that accepts a reversible plug.

However, the separable physical connection of the tablet portion to the separable base portion generally utilizes a single electronic connector, such as a single USB-C connector, for the connection between the portions. For this reason, although a conventional base portion may include multiple USB-C connectors, such connectors do not provide full functionality. This reduced functionality can detract from the user experience in utilizing a detachable system.

BRIEF DESCRIPTION OF THE DRAWINGS

Embodiments described here are illustrated by way of example, and not by way of limitation, in the figures of the accompanying drawings in which like reference numerals refer to similar elements.

FIG. 2 is an illustration of a USB-C receptacle pinout for application in an apparatus or system according to an embodiment;

FIG. 5 illustrates subsequent connector modes that are available for multiple connectors in a system according to an embodiment;

DETAILED DESCRIPTION

Figure 1:
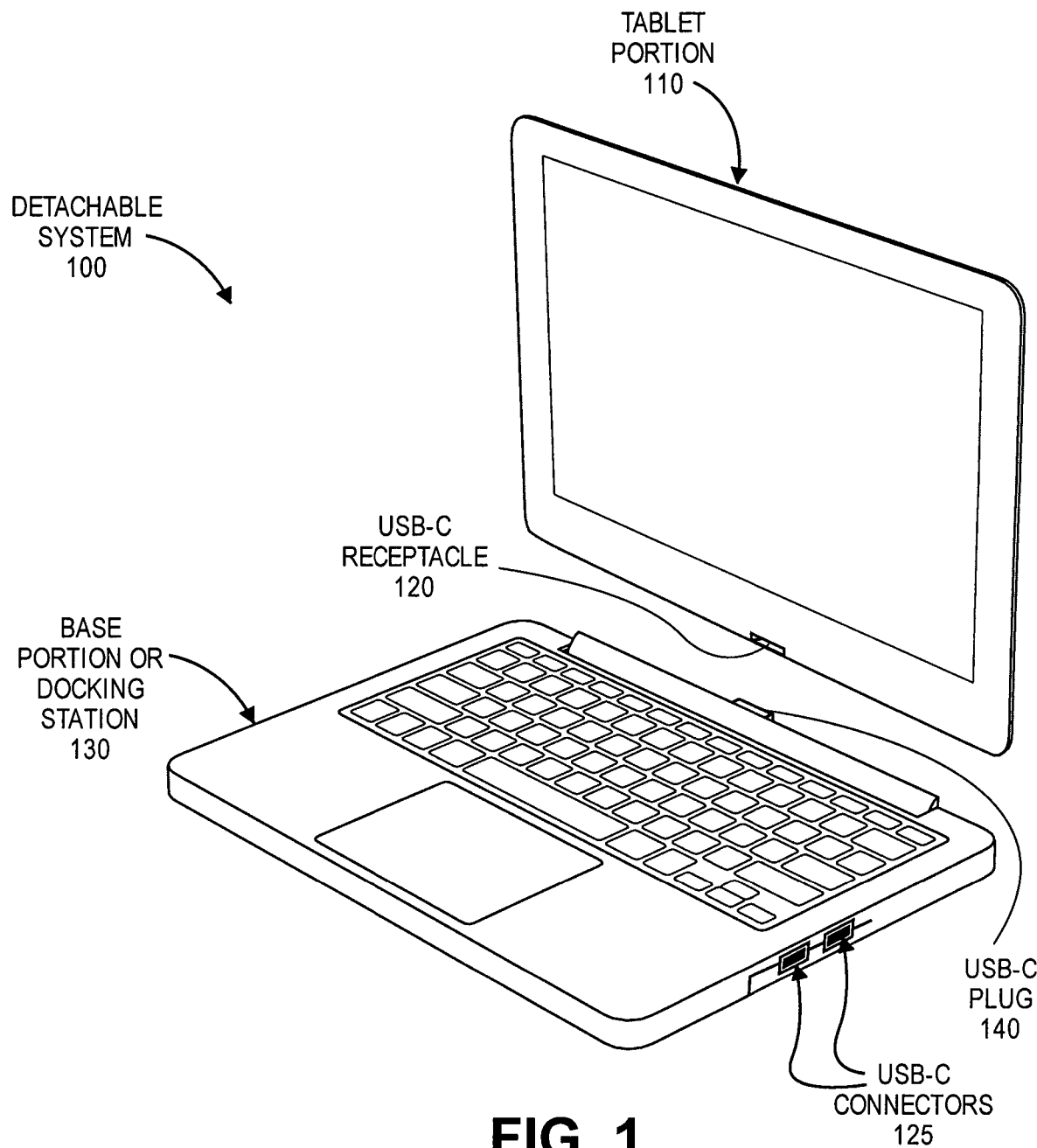
FIG. 1 is an illustration of a detachable system according to an embodiment.

Embodiments described herein are generally directed to dual role capable connectors for a separable portion of a computing apparatus.

For the purposes of this description, the following applies:

"Detachable system" or "detachable computer" refers to a computing apparatus or system including a first portion or assembly including a screen (the tablet or lid portion) and a second separable portion including a keyboard (the base or keyboard portion) that may be coupled using a separable physical connection, which may be referred to as detachable connection. The first portion and second portion may be detached from each other, wherein the first and second portions are operable when coupled together to operate as a notebook computer, and the first portion is operable as a tablet computer when the first portion and second portion are detached from each other.

"Docking station" or "dock" refers to an apparatus to which a computing system, such as a tablet computer or notebook or laptop computer, may be docked via a separable physical connection to a separable docking station, which may be referred to as a docking connection. The docking station may include one or more connectors that are connected to the computing system via the docking connection.

"Connector" or "electronic connector" refers to both a receptacle (to accept a plug) and to a plug (to be inserted in the receptacle). The term connector includes, but is not limited to, a USC Type-C connector.

In some embodiments, an apparatus or system provides multiple connector connections via a separable physical connection, wherein the connection utilizes a single electronic connector. In some embodiments, the multiple connector connections are dual role capable connectors for a computing apparatus, wherein the computing apparatus may include a first portion (such as a tablet or laptop computer) and a separable second portion (such as a base portion of a detachable system or a docking station for a computing system) that are coupled by a separable physical connection. In some embodiments, the dual roles are host and device roles for the interconnection of computing systems. In addition, dual roles may further apply to the power capabilities of the connector, wherein power may be provided from the second portion to the first portion (such as from the base or docking station to the tablet computer) or from the first portion to the second portion (such as from a tablet computer to the base).

In some embodiments, the single electronic connector utilized in a separable connection is a USB Type-C connector, wherein USB Type-C is provided by USB Type-C™ Cable and Connector Specification Revision 1.1 (released Apr. 3, 2015) and subsequent documents. USB standards further include the Universal Serial Bus 3.1 Specification (released Jul. 26, 2013) and the Universal Serial Bus Specification 2.0 (released Apr. 27, 2000), which may generally be referred to herein as USB3 and USB2 respectively. As used herein, a separable connection may include a detachable connection for connection of separable portions of a detachable computer or a docking connection for connection of a computing system to a docking station.

A USB Type-C connector offers the capability to support display, power, and data within a single cable and connector. The USB Type-C connector may further provide for alternative usage with DisplayPort™ operation (a digital display interface developed by the Video Electronics Standards Association (VESA)) connections in a system that supports DisplayPort technology. Detachable systems, which have a tablet (or lid) portion and a base (or keyboard) portion require an electronic connector between these two portions, wherein the USB-C connector is an electronic connector that is well suited for this function. It is anticipated that newly developed docking stations will also utilize the USB-C connector for the purpose of connection of a laptop or other computing system with the docking station.

However, an issue with this usage of USB-C is that the base of the detachable system is generally expected to support multiple USB-C connectors even though the separable physical connection between tablet and base utilizes a single USB-C electronic connector. The reasons for use of a single USB Type-C connector for the physical connection between the tablet and the base include, but are not limited to, the better aesthetics of using a single USB Type-C connector for the tablet to base/docking station connection; the ability to re-use the same connector as a general purpose USB-C connector when the system elements are separated; the limited availability of SoC USB ports; and the added difficulty in aligning the lid and base if multiple connectors are used for the physical connection.

The expected functions of the multiple additional electronic connectors of a detachable base may include dual role (USB host and USB device roles, specifically associated with flow of data in a USB connection, wherein the USB host operates to enumerate and manage communications with the USB device) for connections of computing devices together utilizing the connectors. Although end users may not be aware of this in operation, underlying the connection of systems together with a USB connection is the requirement for the USB-C connector for a first system to operate in a host role and the USB-C connector for a second system to operate in a device role. In addition, there are also other new usages that may be supported by the ability of the USB-C connector to provide a host role and a device role.

A detachable computer appears to be the equivalent of a notebook or laptop computer to the end user when the tablet portion and base portion are physically connected, and thus users generally expect support for the same features as a notebook or laptop computer. Similarly, a docking station may also include multiple connectors that users expect to provide the functionality similar to that of the connectors on a computing system. Manufacturers thus may desire to support the same capabilities on USB connectors whether such connectors are in a laptop computer, in the tablet or the base of a detachable system. Further, in some cases there may be value in providing such capabilities in a docking station because users may not distinguish between electronic connectors available on a computing system and electronic connectors available on the docking station, and thus may expect similar functionality from such connectors.

However, because of the limitation of utilizing a single USB-C connector in a physical connection between a tablet and a base of a detachable computer or between a computing system and docking station, while there may be multiple electronic connectors in the base or docking station, conventional solutions do not support the same capabilities across such multiple connectors in the base or docking station. Conventional docks or bases of detachable systems generally support only a subset of the full USB capabilities (such as display, power, or USB host) across all USB connectors that are present in the dock or base. It may be anticipated that usages with USB device role capability will become more mainstream due to the symmetric nature of a USB-C connector and thus this is an important capability to support across all USB-C connectors.

In some embodiments, the appearance of multiple USB-C connectors is provided on a base of a detachable computer or on a docking station that have capabilities of USB-C even when only a single USB-C is passed down. In some embodiments, an apparatus or system supports consistent capabilities, including dual role capability, on each of a set of connectors in a detachable system. It is noted that a USB3 mode implicitly includes support for USB2 as well.

FIG. 1 is an illustration of a detachable system according to an embodiment. The detachable system 100 includes a first tablet portion 110 and a second base portion 130, wherein the first tablet portion 110 and second base portion 130 are connected together utilizing a separable physical connection, which may include a hingable connector, of the base portion including an electronic connector 140 such as a USB-C connector, which may commonly be a USB plug. The tablet portion 110 includes at least one electronic connector such as a USB-C connector, which may commonly be a USB-C receptacle. Similarly in another implementation a computing system may be docked with a docking station utilizing a similar physical connection.

In some embodiments, the connection between the tablet portion 110 and the base portion 130 may be referred to as a direct connection, as opposed to a cable connection, as the electrical connection is directly between the connector 120 of the tablet portion 110 and the connector 140 of the base portion 130. In such an implementation, the connection is arranged in a particular orientation for a USB-C connection, as opposed to a cable connection in which the USB-C connector may be reversed (turned over). However, embodiments are not limited to this implementation.

In some embodiments, the base portion 130 (or docking station) may include multiple connectors, such as multiple USB-C connectors. In some embodiments, a physical connection between separable portions is implemented with a single electronic connector for each of the tablet portion 110 and the base portion 130. The electronic connectors for the connection may be, for example, the USB-C receptacle 120 for the tablet portion and the USB-C plug for the base portion), wherein the tablet portion 110 thus has the USB-C connector 120 available for any supported purpose when the tablet portion 110 is disconnected from the base portion 130. The tablet portion 110 may include other electronic connectors, such as other USB-C connectors, in addition to connector 120.

In the illustration provided in FIG. 1, the base portion 130 includes a first connector, USB-C plug 140, for the physical connection with the tablet portion 110 and multiple additional connectors, such as multiple USB-C connectors 125, wherein the detachable system 100 utilizes the connection to the USB-C connector 120 of the tablet portion to support the operation of the multiple USB-C connectors 125. In some embodiments, the detachable system 100 supports consistent capabilities including USB dual role capability (host and device capability) on each of the additional connectors 125 in the detachable system.

FIG. 2 is an illustration of a USB-C receptacle pinout for application in an apparatus or system according to an embodiment. As illustrated, the connector pinout 200 includes power/ground and miscellaneous pins for side band use (SBU) (Ground A1/A12 and B1/B12; VBUS: A4/A9 and B4/B9; SBU1: A8; SBU2: B8) and the Configuration Channel (CC1: A5; CC2: B5). The illustration further illustrates 2 pairs of bidirectional USB3.1 data pins (Tx/Rx+/−) (A2/A3, B2/B3, A10/A11, B10/B11) and 2 pairs of (D+/−) pins (A6/A7, B6/B7).

It is generally expected for the connector to utilize both pairs of USB3.1 data pins for alternate modes, or one pair for USB3 mode for the USB-C connector. By default, only one USB2 port is expected to be used in all common cases (i.e., pins A6/B6 are shorted together, and A7/B7 are shorted together) for providing reversibility for the connector in any orientation without need of extra components.

In some embodiments, an apparatus or system utilizes the fact that when a first portion and a second portion are coupled by a physical connection (thus using a direct connector, not connection via a cable), the two pins (out of four USB2 pins A6/A7, B6/B7) are available for use, while such pins generally are not available for use when using the USB-C connector as a general purpose connector because the standard cable to connect to such USB-C connector does not contain the additional two wires for the second USB2 port. In some embodiments, an apparatus or system overloads an additional SoC USB2 port on the extra pins, which enables establishment of a parallel path between the USB2 port connected to an SoC device controller and the USB-C connectors in the base of a detachable computer or in a docking station. Stated in another way, in addition to the existing single USB2 port that is generally supported for both pairs of A6/A7 and B6/B7 pins, an additional SoC USB2 SoC Port is multiplexed on the extra pins. In some embodiments, control logic is provided to control the routing of USB2 ports to different connectors in the base portion of a detachable computer or in the docking station in an implementation in which a computer system is docked in such docking station.

In this manner, it is possible to support a USB "device role" on one connector of a base or docking station, while at the same time enabling a USB "host role" on other connectors of the base or docking station, in addition to simultaneous DisplayPort support on such connectors. Using USB-C connectors, end users can connect two computing systems together, a function that is not possible with two systems each supporting only USB type-A connectors. If supported by the operating system, a user can transfer files between two systems via the USB-C to USB-C connection, wherein a first system operates in the USB host role and a second system operates in the USB device role.

In contrast, if an end user is to plug in a second PC to a connector of a base of a detachable system or a connector of a docking station with conventional operation of a USB-C connector, such connection may or may not operate properly, dependent on whether the second PC in the connection has support for a dual role, and if the device controller of the other system is already in use. This uncertain operation thus results in poor user experience in a conventional system. In some embodiments, an apparatus or system addresses this problem by providing a detachable supporting dual role capability across each of the multiple connectors of a base or docking station. It is noted that this implementation is not provided by the USB-IF specification, which only specifies possibilities but does not indicate how to use USB-C connectors for achieving a specific purpose in different configurations.

Figure 3A:
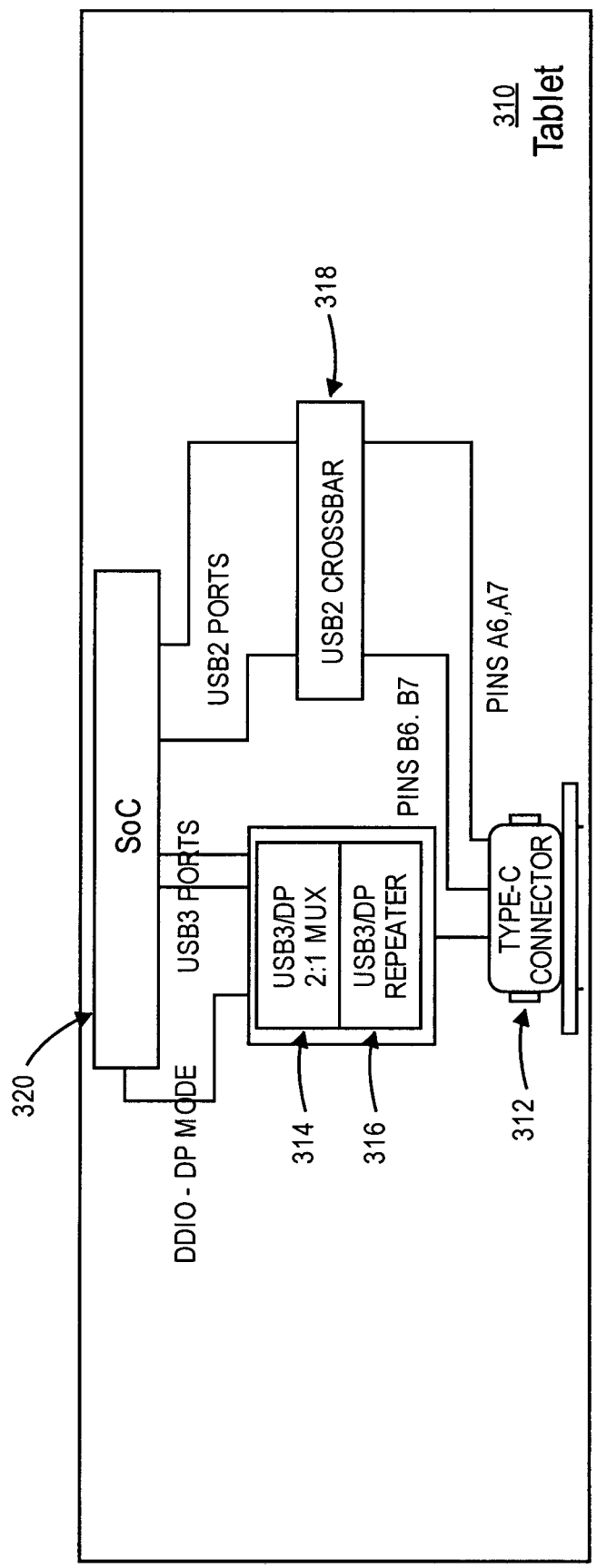
FIGS. 3A-3D are illustrations of data paths for a system providing dual mode connector capability according to an embodiment.
Figure 3B:
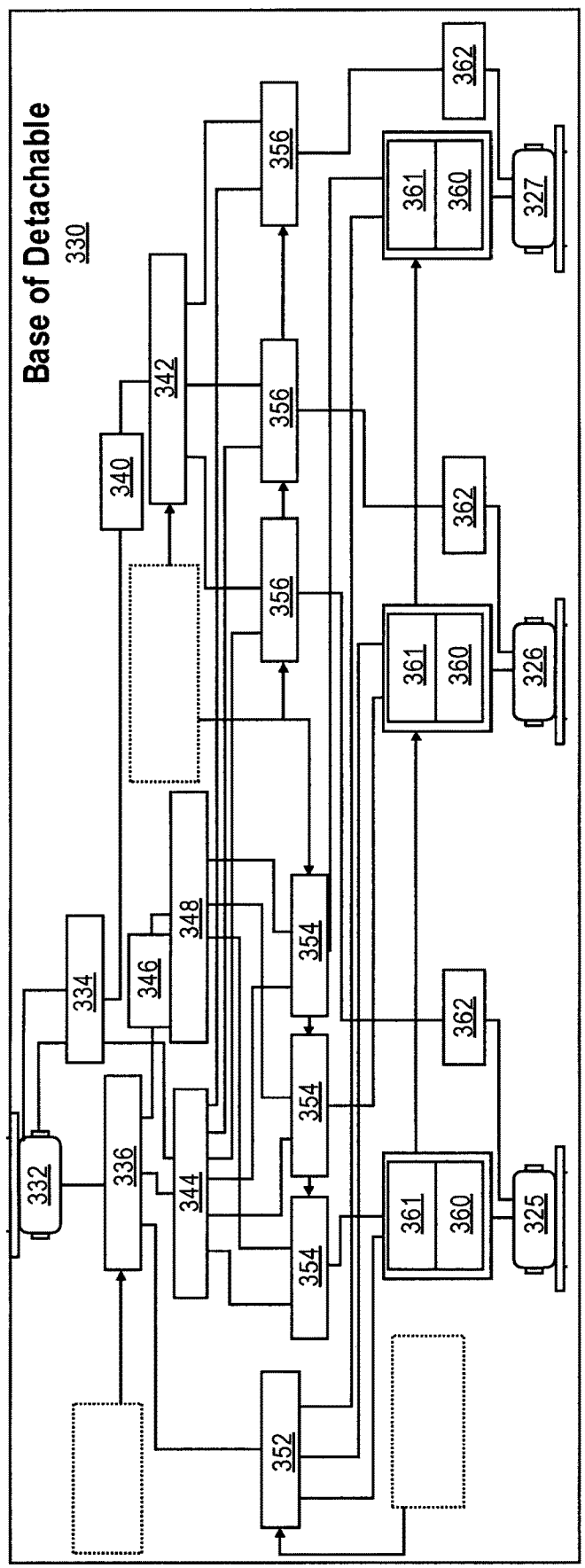
Figure 3C:
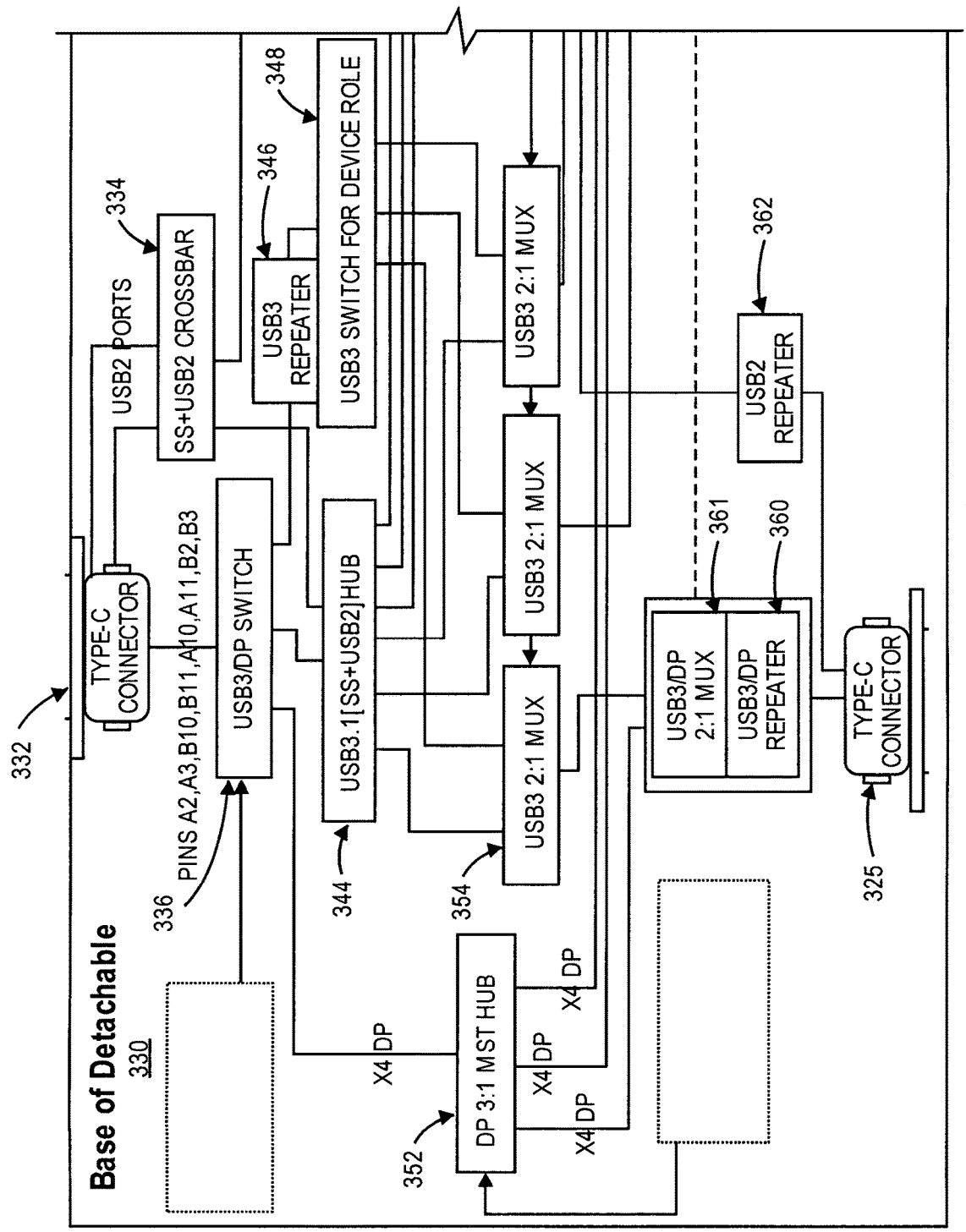
Figure 3D:
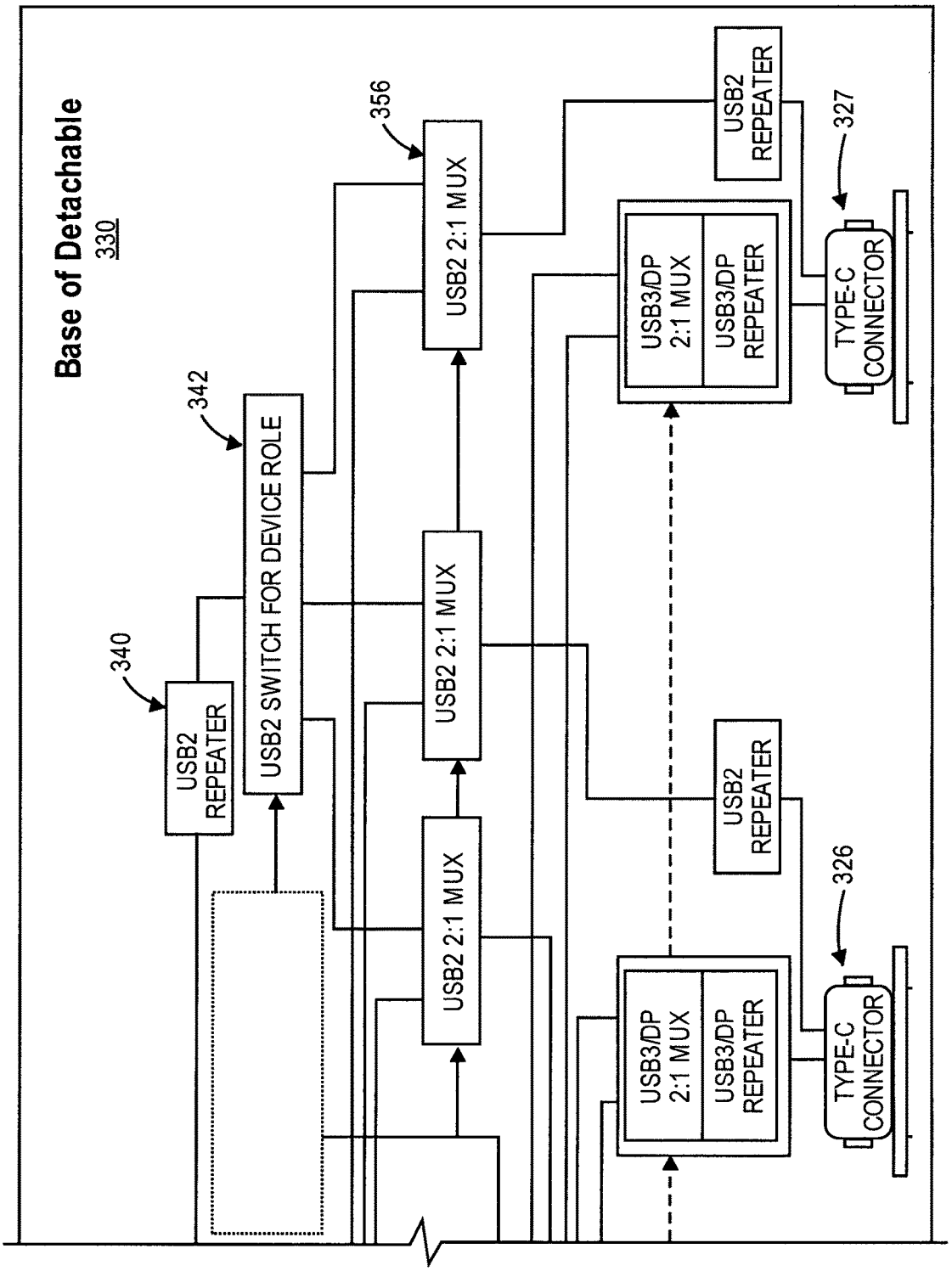

FIGS. 3A-3D are illustrations of data paths for a system providing dual mode connector capability according to an embodiment. FIG. 3A provides an illustration of data paths for a tablet portion of a detachable computer, and FIGS. 3B-3D provides an illustration of the data paths for a base portion of a detachable computer. The illustrations provided in FIGS. 3A-3D are also applicable for a computing system and docking station in a docking implementation.

It is noted that FIGS. 3A-3D illustrate the data-path portions of an implementation, and do not illustrate the control paths (which are provided in FIGS. 4A-4D) or the power delivery related logic of such implementation. FIGS. 3A-3D illustrate a solution architecture implemented in a detachable system (wherein such solution may also be implemented in a docking station) that has support for DisplayPort and for USB.

As provided in FIGS. 3A-3D, basic USB-C architecture is assumed, wherein there is control logic per connector to determine needs of port partner connected to that specific connector and there is a central agent (a microcontroller) present in the base of the detachable that controls resource sharing across multiple connectors. However, embodiments are not limited to this particular configuration, and the functions may be provided by other elements within the computing system.

As illustrated in FIG. 3A, a tablet 310 may include one or more USB Type-C connectors or other connectors, including USB Type-C connector 312 (which may commonly be a USB Type-C receptacle). Other connectors of the tablet 310, if any, are not illustrated in FIG. 3A. In some embodiments, the tablet 310 includes a system on chip (SoC) 320 or other similar processing element. In some embodiments, the SoC provides data paths for a DisplayPort mode (DP mode), USB3 ports, and USB2 ports. In some embodiments, data paths from the connector 312 are coupled with a USB3/DP 2:1 repeater 316 and a multiplexer 314 (USB3/DP 2:1 mux) to choose one of the paths for the DP mode or the USB3 ports. In some embodiments, the connector 312 further provides data paths for USB2 ports (pins A6/A7, and B6/B7) via a USB2 crossbar 318 to the SoC 320.

FIG. 3A shows two USB2 ports routed to the USB-C connector 312 in the tablet 310 along with USB/DP multiplexer outputs routed to the super-speed pins of the USB-C connector 312. The connector 312 may be used as general purpose connector when tablet 310 is detached from a base or can be used as docking connector when the tablet is connected to the base. By default, the tablet 310 enables only one of the two USB2 ports based on the orientation. In some embodiments, the tablet 310 has tablet control logic directing the device to expose only a single USB2 port when connected as general purpose connector to meet USB type-C compliance requirements, but to expose two ports when the tablet is connected to the base or docking station that it identifies to provide additional capabilities in a docking configuration.

As illustrated in FIGS. 3B-3D (where FIG. 3B provides a full overview illustration, with FIG. 3C providing a detailed version of a first (left side) half of FIG. 3B and FIG. 3D providing a detailed version of a second (right side) half of FIG. 3B), a base portion of a detachable device 330 (or a docking station) may include a first connector (such as a USB Type-C connector) 332 for the docking connection with the tablet 310, wherein multiple additional connectors 325, 326, and 327 are provided and supported via the first connector 332. In some embodiments, the base portion 330 includes data paths for a DisplayPort mode, USB3 ports, and USB2 ports.

In some embodiments, the first connector 332 is coupled with a USB3/DP switch 336 for USB3 and DisplayPort data and a USB2 crossbar 334 for USB2 data. The USB3/DP switch 336 is coupled with a DisplayPort MST (Multi- Stream Transport) hub or switch 352 for connection to a USB3/DP 2:1 multiplexer 361 and USB3/DP 2:1 repeater 360 for each of the connectors 325-327.

Further, the USB3/DP switch 336 is coupled with a USB3.1 (SS (SuperSpeed USB)+USB2) hub 344, which is coupled with a USB3 2:1 multiplexer 354 for each of the connectors 325-327; and to a USB2 2:1 multiplexer 356 for each of the connectors 325-327 via a USB2 repeater 362.

Further, the USB3/DP switch 336 is coupled with a USB3 switch for device role 348 via a USB3 repeater 346, wherein the USB3 switch 348 is then coupled with each USB3 2:1 multiplexer 354.

In some embodiments, SS+USB2 crossbar 334 is coupled with a USB2 switch for device role 342, which is further coupled with the USB2 2:1 multiplexer 356 for each for each of the connectors 325-327.

FIGS. 4A-4D are illustrations of control paths for a system providing dual mode connector capability according to an embodiment. However, embodiments are not limited to the particular implementation for the control structure of a system illustrated in FIGS. 4A-4B. Embodiments may include other and different control elements to control the paths for the system.

Figure 4A:
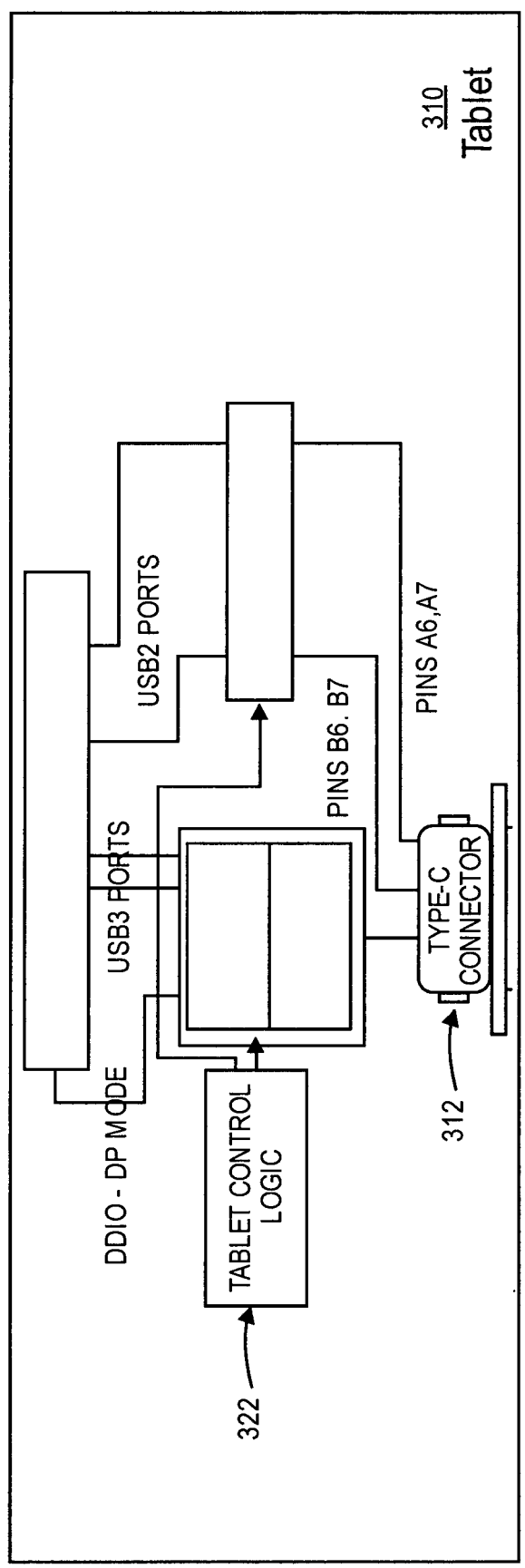
FIGS. 4A-4D are illustrations of control paths for a system providing dual mode connector capability according to an embodiment.

As illustrated in FIG. 4A, in some embodiments, in addition to elements provided in FIG. 3A, a tablet 310 includes a tablet control logic 322. In some embodiments, the tablet control logic 322 provides control functions for connection operation, which may include:

(a) Controlling what signals are applied to USB3.1 data pins at any given time based on the needs of the base portion of the detachable system (i.e., DisplayPort x4 mode or DisplayPort x2 mode+USB3 or 2 ports of USB3, etc.).

(b) Controlling how USB2 is routed to the base portion of the detachable system, wherein: (1) For general purpose connector usage, the tablet control logic connects only one SoC USB2 port to both pairs of pins A6/A7 and B6/B7 to meet USB-C compliance requirements; and (2) In a docking state, the tablet control connects two different USB2 ports from SoC to different pins, and specifically a first USB2 port is directed to the A6/A7 pins and a second USB2 port is directed to the B6/B7 pins to provide simultaneous USB2 host & USB2 device roles on different connectors on the base of the detachable.

Figure 4B:
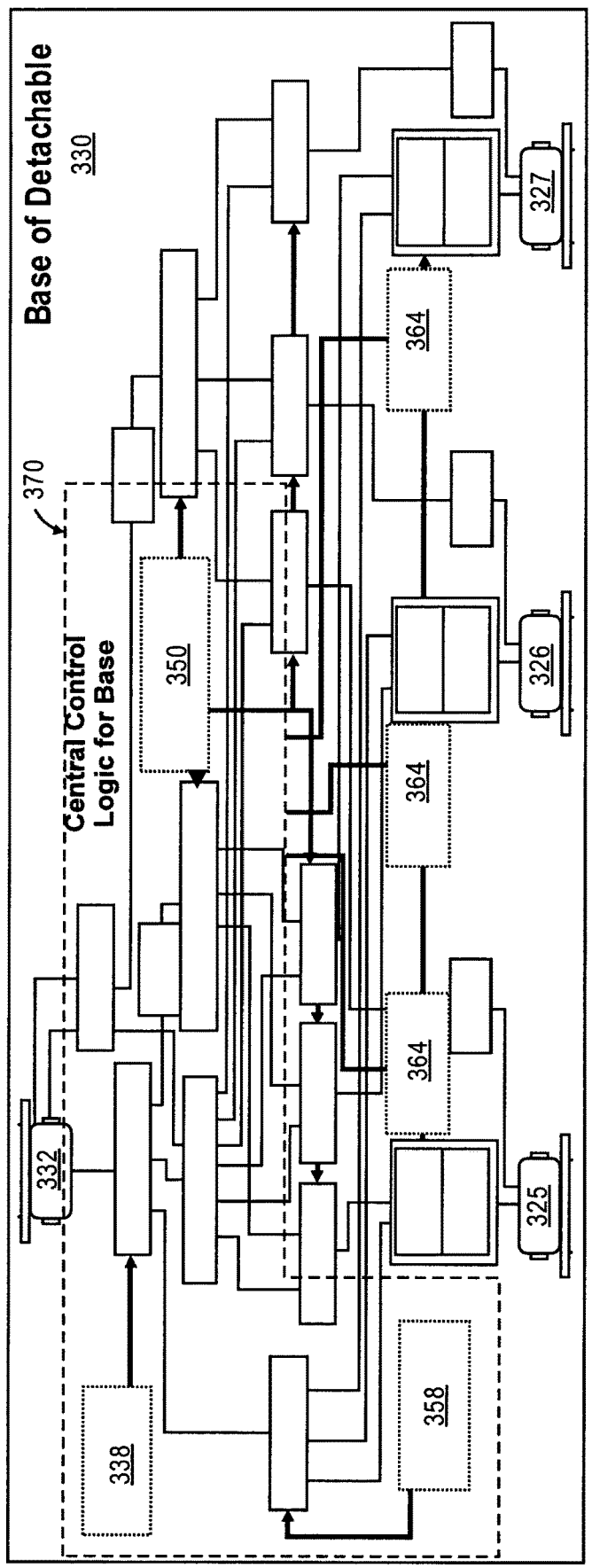
Figure 4C:
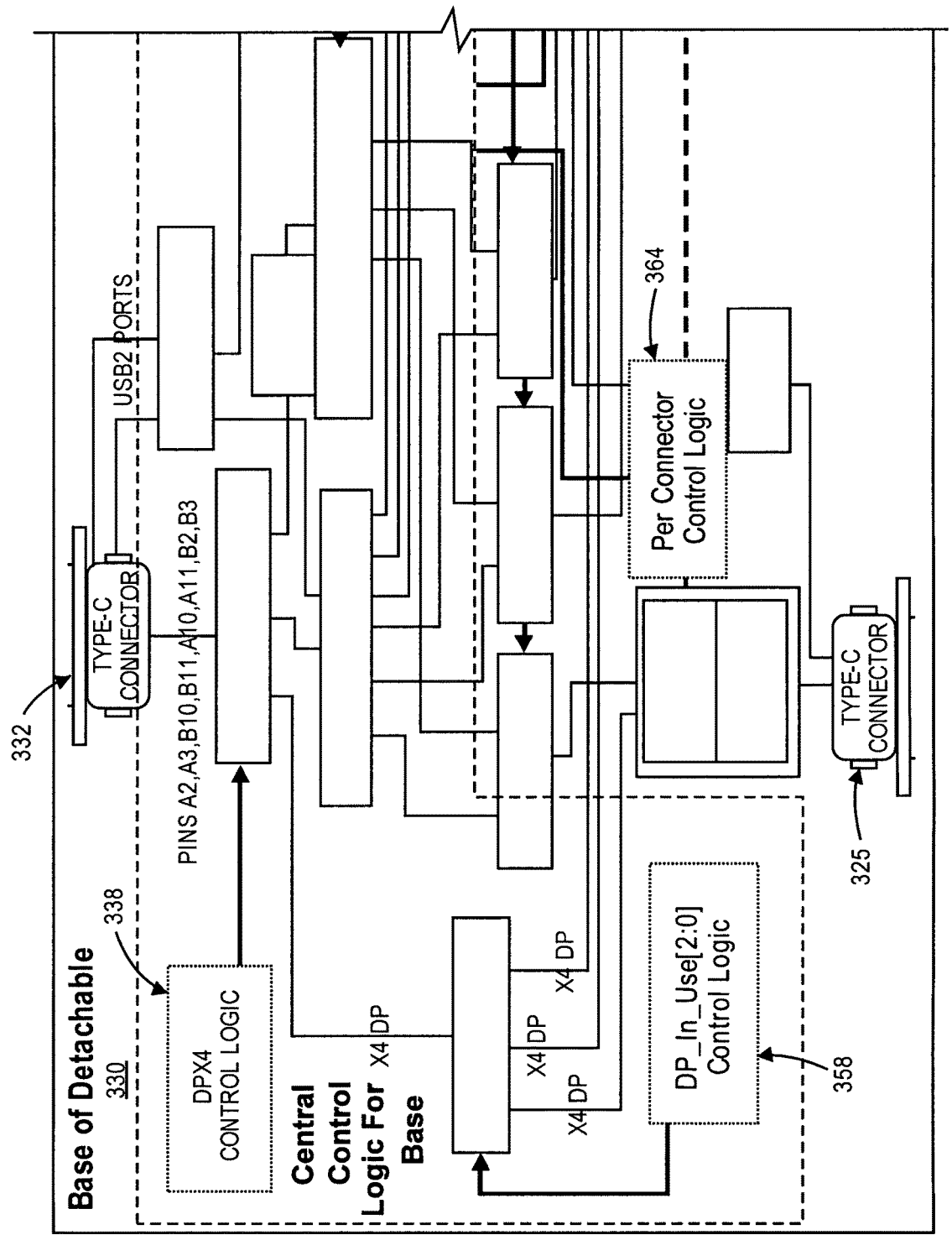
Figure 4D:
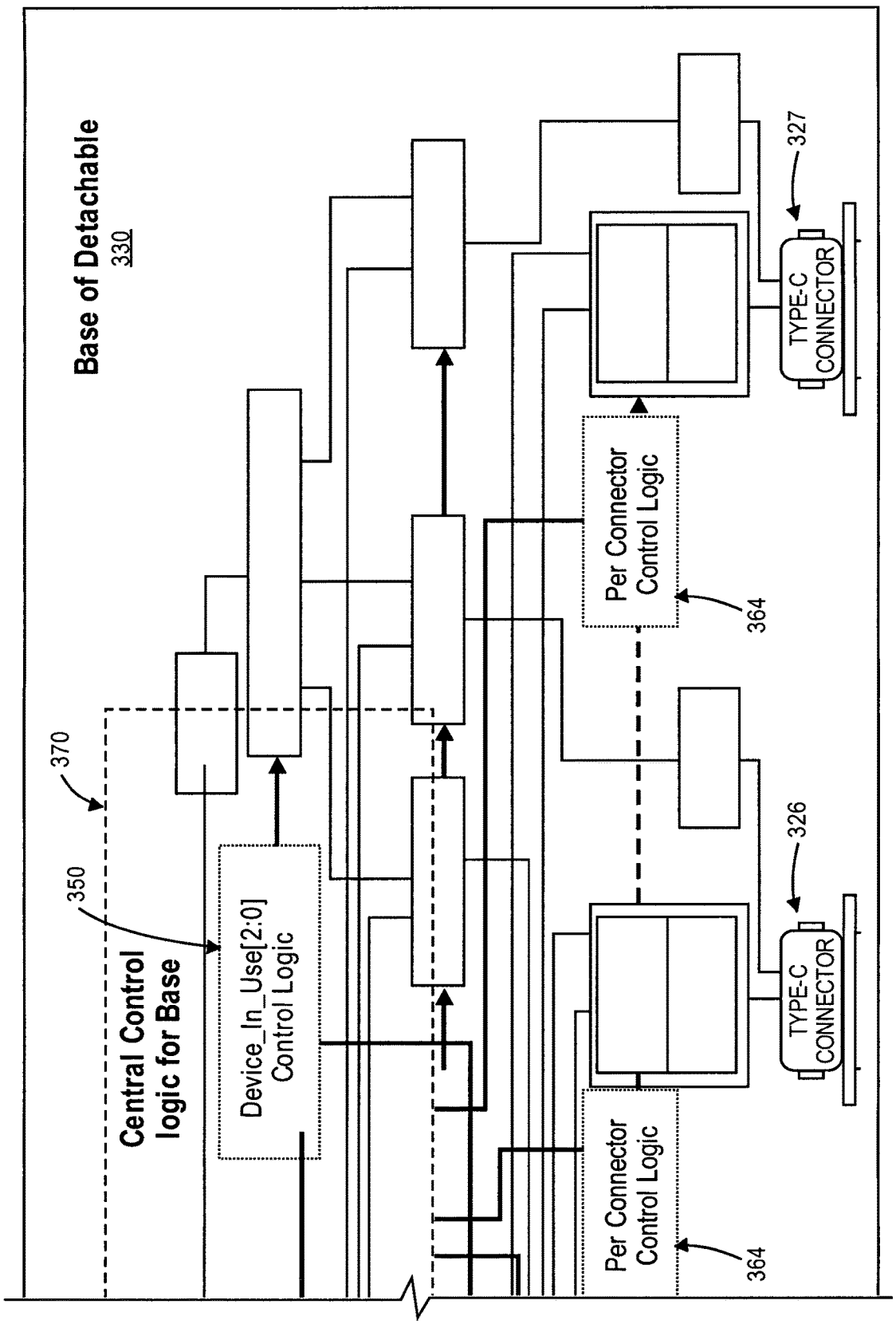

As illustrated in FIGS. 4B-4D (where FIG. 4B provides a full overview illustration, with FIG. 4C providing a detailed version of a first (left side) half of FIG. 4B and FIG. 4D providing a detailed version of a second (right side) half of FIG. 4B), in some embodiments, in addition to elements provided in FIG. 4A, a base portion of a detachable system 330 includes central control logic 370 to control data paths in relation to the first connector 332, including DisplayPort x4 control logic 338 to control USB/DP switching, the DisplayPort x4 control logic 338 specifically determining if USB3.1 data pins on first connector 332 are to support DisplayPort X4 mode, DisplayPort x2+USB3 mode, or USB3 mode only and passing appropriate signals to the output of switch 336; Device-in-Use [2:0] control logic 350 to determine which of connectors 325, 326, and 327 are to receive USB3 and USB2 device role connection; and DP_in_Use[2:0] control logic 358 to determine which of connectors 325, 326, and 327 are to receive a DisplayPort connection, together with per connector control logic for operation at each connector 325-327 which determines if a specific connector should support DisplayPort X4 mode or DisplayPort x2+USB3 mode or USB3 only mode.

For the tablet 310 and base 330 of the detachable system as illustrated in FIGS. 3A-3D and 4A-4D:

(1) The USB2 crossbar 334 provides for supporting different orientations of the tablet 310 with respect to the base 330.

(2) One of the USB2 ports will be in the device role utilizing the USB2 device role switch 342.

(3) A second USB2 port is directed to input of USB3+ USB2 hub 344.

(4) SuperSpeed pins from USB-C connector are directed to a switch, which can send its output to either:

(a) DP MST hub or switch 352 as DP x4 signals, or (b) DP MST hub or switch 352 as DP x2 signals, along with sending one USB3 port to USB3.1 Hub 344, or (c) USB3 device role switch 348 for one USB3 port, along with sending one USB3 port to the USB3.1 Hub 344.

(5) There are 2:1 multiplexers 354 and 356 to multiplex between host and device roles for USB3 and USB2 ports, respectively, which are outputs of the USB3.1 Hub 344 & 3:1 discrete switches 348 and 342.

(6) The outputs of the DP MST Hub/Switch 352 are multiplexed again (using USB3/DP multiplexer 361) with USB3 signals from 2:1 device/host multiplexers' output 354 to support USB/DP capability on all USB-C connectors.

(7) To meet signal integrity requirements, appropriate paths may have either explicit repeaters (346, 340, and 362) for USB3/USB2 path or may have implicit repeaters in Hubs (344 and 352). However, embodiments are not limited to the particular implementation illustrated in FIGS. 3B-3D.

(8) Central control logic 370 is illustrated for the base 330, wherein the logic may be a dedicated microcontroller in the base 330 of the detachable. In one implementation the dedicated microcontroller may be an embedded controller.

FIG. 5 illustrates subsequent connector modes that are available for multiple connectors in a system according to an embodiment. In some embodiments, a first connector of a computing system that is connected (i.e., a connector that is connected when there are no other active connections) may choose any supported connector mode, while subsequent connectors choose from the connector modes that remain available based on the choice of previously connected connectors. FIG. 5 provides the connector modes that are available in each illustrated instance. In some embodiments, a detachable system supports the following data-path options:

(1) USB3 Host Mode—Capability to support Host Mode simultaneously across multiple connectors utilizing a hub.

(2) USB3 Device Mode—Capability to support device role that is limited to a single connector at any given time, with all connectors being capable of the device role.

(3) DisplayPort Alternate Mode (Alt Mode)—Capability to support the following options simultaneously across multiple connectors:

(a) Supporting DP x4 Alt Mode on any connector (if other connectors don't require use of USB3 mode); or (b) Supporting DP x2 plus USB3 host mode on any other connector.

(4) USB2 device mode—If other connectors are using DisplayPort Alternate Mode, then the connector with the device role defaults to USB2 operation due to the limited number of pins between the tablet the base of the detachable system.

When a port partner is connected on a USB-C connector, the connector's local policy manager is to inform the central agent regarding capabilities of the port partner. The central agent is to view available and allocated resources in the base, and then is to determine, based at least in part on the available and allocated resources, a mode of operation for the requesting connector. In some embodiments:

(a) If no port partners are currently connected to the base connectors and a first port partner is capable of supporting DP x4 to support high resolution displays, then a central agent for the base is to allow the DP x4 mode for the first port partner. If one or more port partners are subsequently connected to the base connectors and the subsequent port partners require USB capabilities, then either the subsequent partners will be restricted to USB2 mode only, or the DisplayPort capabilities on the first connector can be renegotiated to reduce it to DP x2 mode. This choice is a central agent policy decision, and can be flexible to suit needs of specific system and end user expectations. For example, a choice may be made to exclude renegotiation in circumstances in which there is active data transfer on the relevant connector. In some embodiments, the central agent will allocate USB2 device role port to the connector requesting device role support on a first come first serve basis.

(b) If no port partners are currently connected to the base connectors and a first port partner is a USB3 capable host, then central agent may allocate a second USB3 port to allow a subsequent connector to be in USB3 device mode. If one or more port partners are subsequently connected to the base connectors and the subsequent port partners require USB capabilities, then USB3 host roles are supported for the other base connectors. Other connectors requiring DisplayPort capabilities may change device connection on the first connector to be USB2 only mode to allow such capabilities. This is a central agent policy decision and it can be flexible to suit needs of specific system and end user expectations.

(c) In some embodiments, a simple policy may assume all connectors only support DP x2+USB3 mode. This implementation enables support of DisplayPort as well as USB3 (host) on multiple connectors, and any port partner requiring a device role capability may use USB2 device mode.

In some embodiments, an implementation enables a detachable system to support similar capabilities as a laptop or notebook PC while utilizing a single USB-C connector connection purposes, with multiple additional connectors in the base of the detachable being derived from the single electronic connector that is utilized for the connection. Although certain restrictions on DisplayPort resolutions may apply when multiple connectors are used in the base of the detachable system, an embodiment of a detachable system provides a reasonable tradeoff in functionality that can be achieved, and allows improved flexibility for detachable or docking usages in comparison with conventional technology.

Figure 6:
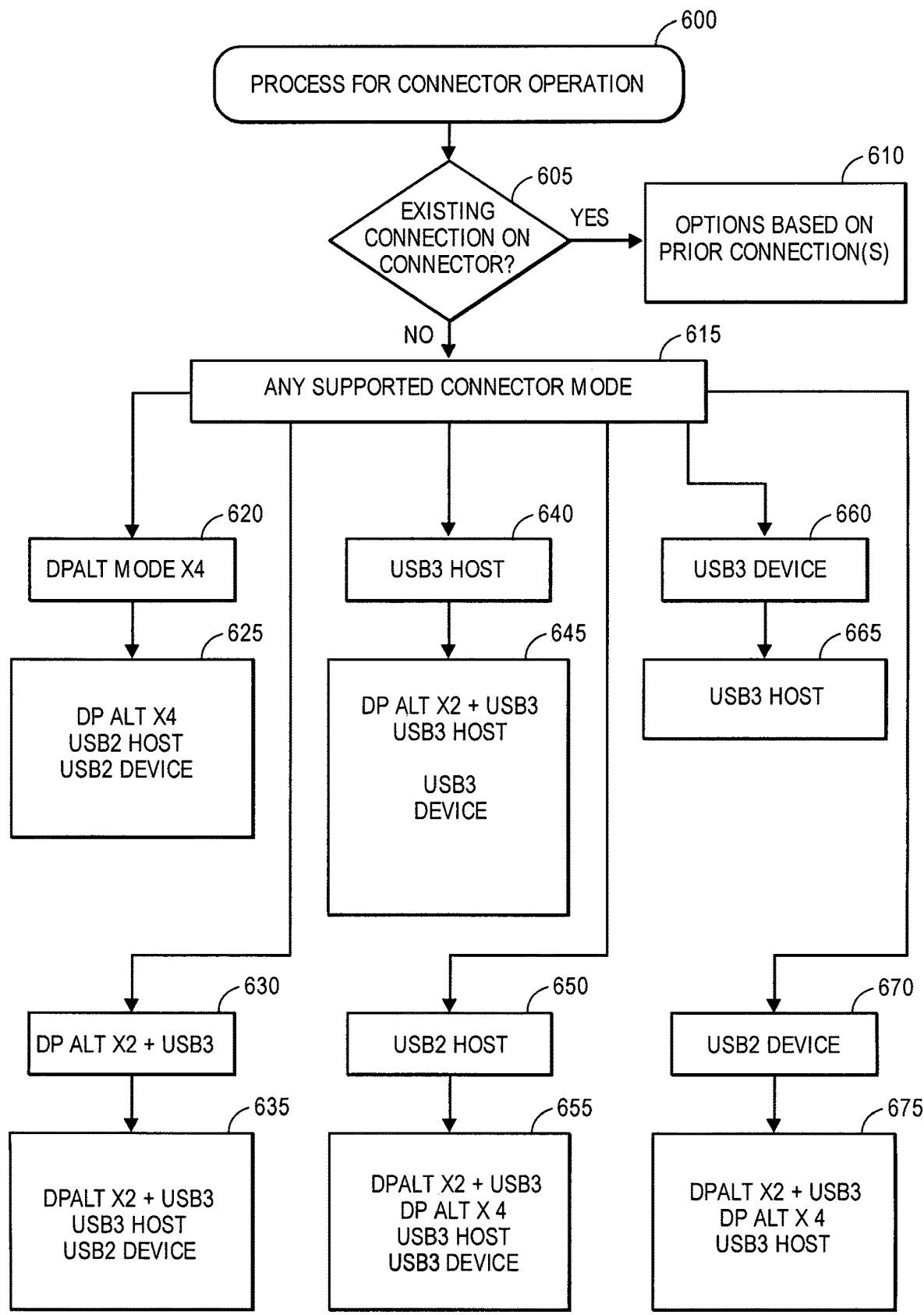
FIG. 6 is a flowchart to illustrate a process for connector operation in a computer system according to an embodiment.

FIG. 6 is a flowchart to illustrate a process for connector operation in a computer system according to an embodiment. In some embodiments, a process 600 for connector operation for a computing system including a base portion or docking station including multiple connectors (such as USB-C connectors) supported by connection to a single connector in a separable physical connection includes the following:

605: Determining if there are any existing connections on the multiple connectors of the base portion or docking station.

610: If so, then the options for a connector mode connection are based on the relevant existing connections as provided in elements 620 to 675.

615: If not, then any supported connector mode may be selected.

If the following connector modes are selected, then the respective options for subsequent connector connections are available:

620: DisplayPort Alternate x4 Mode:
625: DP Alternate x4 Mode; USB2 Host Mode; or USB2 Device Mode. Alternatively, in certain circumstances (such as when there is no active DisplayPort traffic) the DP Alternate x4 Mode may be renegotiated to provide additional options.
630: DisplayPort Alternate x2+USB3 Mode:
635: DP Alternate x2+USB3 Mode; USB3 Host Mode; or USB2 Device Mode.
640: USB3 Host Mode:
645: DP Alternate x2+USB3 Mode; USB3 Host Mode; USB3 Device Mode.
650: USB2 Host Mode:
655: DP Alternate x2+USB3 Mode; DP Alternate x4 Mode; USB3 Host Mode; or USB3 Device mode.
660: USB3 Device Mode:
665: USB3 Host Mode.
670: USB2 Device Mode:
675: DP Alternate x2+USB3 Mode; DP Alternate x4 Mode; or USB3 Host Mode.

Embodiments are not limited to the particular connection mode options provided in 620-675, but rather may apply varying modes for a subsequent connection. In operation, the available options are limited by the limited number of pins available on a single USB-C connector. The operations provided in connection mode options provided in 620-675 including an assumption that a system level policy discourages the interruption of the connection on the first connector, while concurrently supporting defined modes on other connectors. However, embodiments are not limited to such a policy, and a system level policy may include different priorities and operational choices. In an alternative embodiment, a system may optionally notify a user regarding available connector modes and allow the user to determine connection choices or to override choice across the multiple available connectors.

In some embodiments, the per connector and central logic in the tablet and base are continuously or regularly updating the connector modes and connection state, and thus the logic will have a current system state to make a decision for a next connection event based on current system state. In some embodiments, the current system state allows a subsequent connection to have the benefit of additional available connector options upon an earlier connection being disconnected.

Figure 7:
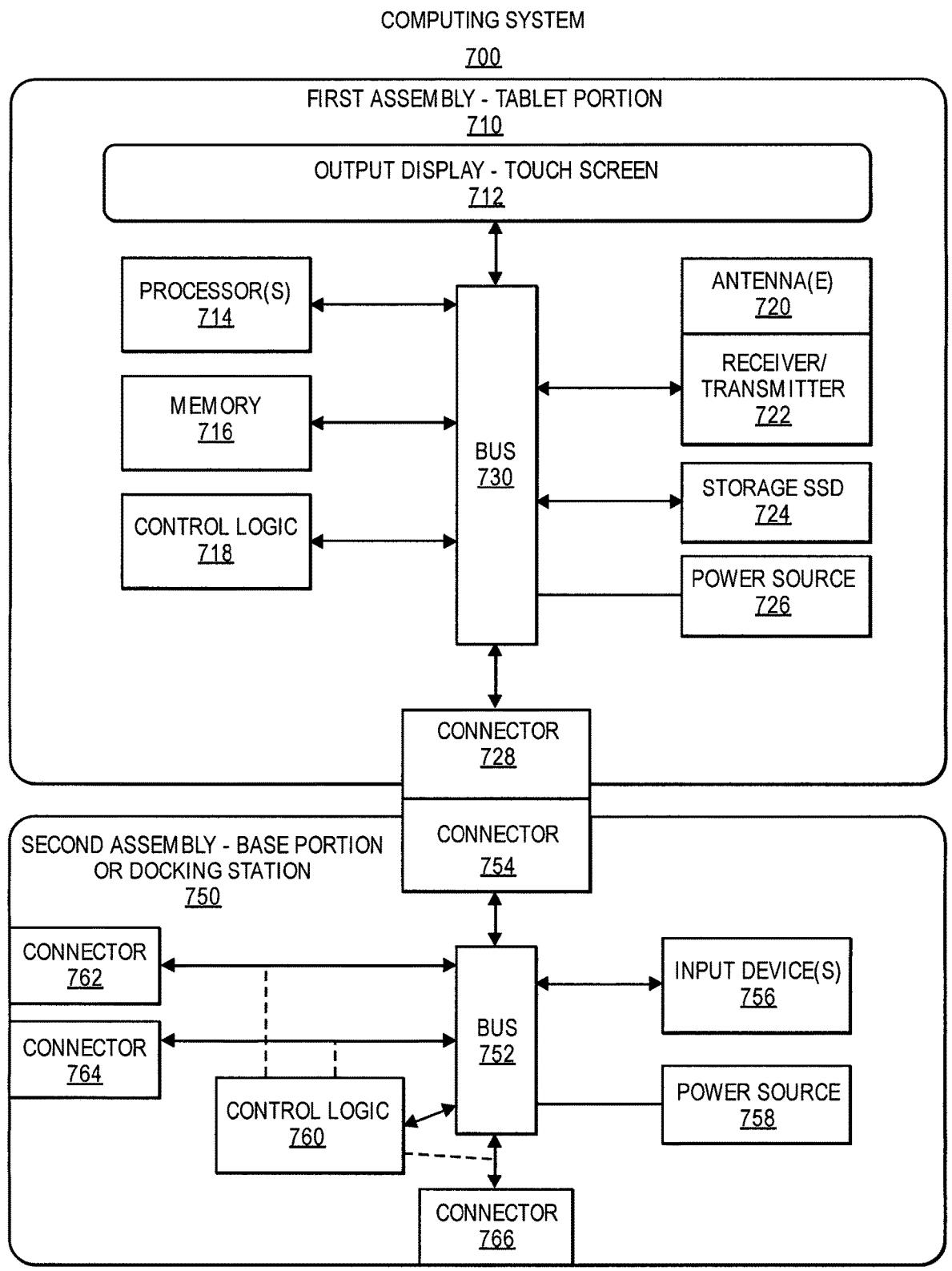
FIG. 7 is an illustration of an embodiment of a computing system including dual role capable connectors according to an embodiment.

FIG. 7 is an illustration of an embodiment of a computing system including dual role capable connectors according to an embodiment. In this illustration, certain standard and well-known components that are not germane to the present description are not shown. Elements shown as separate elements may be combined, including, for example, an SoC (System on Chip) combining multiple elements on a single chip.

In some embodiments, a computing system 700 includes a first assembly 710, such as a tablet portion 710, and a second assembly 750, such as a base portion or docking station, that are coupleable via a separable physical connection. In some embodiments, the first portion 710 and the second portion 750 may be hingeably coupled as a detachable computing system. In some embodiments, the first portion 710 may be docked in the second portion 750, the second portion acting as a docking station. In some embodiments, the computing system 700 may be as illustrated in FIGS. 3A-3D and 4A-4D. FIG. 7 is intended to provide illustration of the components that may be included in the computing system 700, and is not intended to illustrate scale or construction detail for the illustrated components.

In some embodiments, the first assembly 710 includes one or more electronic connectors, including a first electronic connector 728 operating according to a certain standard, such as a USB Type-C connector. In some embodiments, the second assembly includes a compatible first electronic connector 754, such as a first USB Type-C connector, and multiple additional connectors, such as additional electronic connectors 762, 764, and 766. In some embodiments, the additional electronic connectors 762-766 are supported by the connection utilizing the electronic connector 728 of the first assembly.

In some embodiments, the connector 728 is coupled to a bus 730, which is a communication means for transmission of data. The bus 730 is illustrated as a single bus for simplicity, but may represent multiple different interconnects or buses and the component connections to such interconnects or buses may vary. The bus 730 shown in FIG. 7 is an abstraction that represents any one or more separate physical buses, point-to-point connections, or both connected by appropriate bridges, adapters, or controllers. The bus 730 may include interconnects within one or more chips or packages.

In some embodiments, the first assembly 710 includes a control logic 718 coupled to the bus 730, the control logic proving control of connectors, such as, for example, the tablet control logic 322 illustrated in FIG. 4A. In some embodiments, the first assembly 710 may further include a processing means such as one or more processors 714 coupled to the bus 730. The processors 714 may comprise one or more physical processors and one or more logical processors. In some embodiments, the processors may include one or more general-purpose processors or special-processor processors.

In some embodiments, the first assembly 710 further comprises memory 716, which may include a random access memory (RAM) or other dynamic storage device or element as a main memory, wherein main memory may include, but is not limited to, dynamic random access memory (DRAM); a non-volatile memory; and a read only memory (ROM) or other static storage device for storing static information and instructions for the processors 714.

In some embodiments, the first assembly 710 includes one or more transmitters or receivers 722 coupled to the bus 730. In some embodiments, the first assembly 710 may include one or more antennae 720, such as dipole or monopole antennae, for the transmission and reception of data via wireless communication using a wireless transmitter, receiver, or both. Wireless communication includes, but is not limited to, Wi-Fi, Bluetooth™, near field communication, and other wireless communication standards.

Further, the first assembly may include a storage device such as a solid state drive (SSD) 724 (including a removable storage device), and a battery or other power source 726, which may include a solar cell, a fuel cell, a charged capacitor, near field inductive coupling, or other system or device for providing or generating power in the first assembly 710. The power provided by the power source 726 may be distributed as required to elements of the first assembly 710.

In some embodiments, the first assembly 710 includes an output display 712, wherein the display 712 may include a liquid crystal display (LCD) or any other display technology, for displaying information or content to a user. In some environments, the display 712 may include a touch-screen that is also utilized as an input device for the first assembly 710.

In some embodiments, the first connectors 754 and the additional connectors 762-766 of the second assembly may be connected via bus 752. In some embodiments, the second assembly 750 includes a control logic 760 coupled to the bus 752, the control logic proving control of connectors, such as, for example, the central control logic 370 illustrated in FIGS. 4B-4D.

In some embodiments, the second assembly 750, such as in the form of a base portion of a detachable system, includes one or more input devices 756 for the input of data, including hard and soft buttons, a joy stick, a mouse or other pointing device, a keyboard, voice command system, or gesture recognition system.

In some embodiments, the second assembly 750 may be powered by the power source 726 of the first assembly 710, or, in other implementations, the first assembly 710 may be powered by the first assembly 750. In some embodiments, the second assembly 750 includes an additional battery or other power source 758, which may include a solar cell, a fuel cell, a charged capacitor, near field inductive coupling, or other system or device for providing or generating power in the second assembly 750.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, an apparatus include a separable physical connection to a second apparatus; a first electronic connector, the first electronic connector providing data connections for the physical connection; a plurality of additional electronic connectors, the plurality of additional electronic connectors being supported by the first electronic connector; and a control logic to control operation of the plurality of additional electronic connectors, wherein operation of the plurality of additional electronic connectors includes each electronic additional connector being capable to operate in both a host role and a device role for the interconnection of computing systems, wherein the host role and device role may be for a first connector mode or a second connector mode, and an alternative connector mode.

In some embodiments, only one of the plurality of additional electronic connectors may be in a device role at any time.

In some embodiments, the apparatus further includes a first switch for selection of either the first connector mode or the alternative connector mode.

In some embodiments, the apparatus further includes a first hub for the first connector mode and the second connector mode and a second hub or switch for the alternative connector mode, the first hub and second hub or switch being coupled with the first switch.

In some embodiments, the apparatus further includes a first switch for selection of the device role for the first connector mode and a second switch for selection of the device role for the second connector mode.

In some embodiments, the apparatus is a base portion of a detachable computing system, the second apparatus being a tablet portion of the detachable computing system.

In some embodiments, the apparatus is a docking station, the second apparatus being a computing system that is dockable with the docking station.

In some embodiments, the first electronic connector and each of the plurality of additional electronic connectors are USB (Universal Serial Bus) Type-C connectors. In some embodiments, wherein the first connector mode is USB3 and the second connector mode is USB2.

In some embodiments, the alternative connector mode is DisplayPort.

In some embodiments, the alternative connector mode is either DisplayPort Alternate x2 mode plus USB3 mode or DisplayPort Alternate x4 mode.

In some embodiments, a system includes a first assembly, the first assembly including: one or more electronic connectors, the one or more electronic connectors including a first connector, and control logic to control operation of the first connector; a second assembly to be connected with the first assembly, the second assembly including a second electronic connector, the second electronic connector to provide data transfer between the first assembly and the second assembly, a plurality of additional electronic connectors, the plurality of additional electronic connectors being supported by the second electronic connector, and a control logic to control operation of the plurality of additional electronic connectors. In some embodiments, operation of the plurality of additional electronic connectors includes each additional electronic connector being capable to operate in both a host role and a device role for interconnection of computing systems, wherein the host role and device role may be for a first connector mode or a second connector mode, and an alternative connector mode.

In some embodiments, only one of the plurality of additional electronic connectors may be in a device role at any time.

In some embodiments, the second assembly further including a first switch for selection of either the first connector mode or the alternative connector mode.

In some embodiments, the second assembly further including a first hub for the first connector mode and the second connector mode and a second hub or switch for the alternative connector mode, the first hub and second hub or switch being coupled with the first switch.

In some embodiments, second assembly further including a first switch for selection of the device role for the first connector mode and a second switch for selection of the device role for the second connector mode.

In some embodiments, the system includes a detachable computing system.

In some embodiments, the first connector, the second connector, and each of the plurality of additional electronic connectors are USB (Universal Serial Bus) Type-C connectors.

In some embodiments, a non-transitory computer-readable storage medium having stored thereon data representing sequences of instructions that, when executed by a processor, cause the processor to perform operations including detecting a connection at a first electronic connector of a plurality of electronic connectors of a computing apparatus; determining whether there are one or more active connections with other electronic connectors of the plurality of electronic connectors; upon determining that there are no active connections with other electronic connectors of the plurality of electronic connectors, allowing the first electronic connector to be operated in any of a host role or a device role for the interconnection of computing systems, wherein the host role and the device role may be for a first connector mode or a second connector mode, or an alternative connector mode; and upon determining that there are one or more active connections with other electronic connectors of the plurality of electronic connectors, allowing the first electronic connector to be operated in the host role for the interconnection of computing systems, or the device role for the interconnection of computing systems if none of the active connections for the other connectors provides the device role.

In some embodiments, upon determining that there are one or more active connections with other electronic connectors of the plurality of connectors, further allowing the first connector to be operated in the alternative connector mode upon determining that none of the other connectors provide the device role in the first connector mode.

In some embodiments, upon determining that there are one or more active connections with other connectors of the plurality of electronic connectors, further limiting the first electronic connector to be operated in the device role in the second connector mode upon determining that another of the electronic connectors is being operated in the alternative connector mode.

In some embodiments, an apparatus includes means for detecting a connection at a first electronic connector of a plurality of electronic connectors of a computing apparatus; means for determining whether there are one or more active connections with other electronic connectors of the plurality of electronic connectors, upon determining that there are no active connections with other electronic connectors of the plurality of electronic connectors, means for allowing the first electronic connector to be operated in any of a host role or a device role for the interconnection of computing systems, wherein the host role and the device role may be for a first connector mode or a second connector mode, or an alternative connector mode; and upon determining that there are one or more active connections with other electronic connectors of the plurality of electronic connectors, means for allowing the first electronic connector to be operated in the host role for the interconnection of computing systems, or the device role for the interconnection of computing systems if none of the active connections for the other connectors provides the device role.

In some embodiments, upon determining that there are one or more active connections with other electronic connectors of the plurality of connectors, further allowing the first connector to be operated in the alternative connector mode upon determining that none of the other connectors provide the device role in the first connector mode.

In some embodiments, upon determining that there are one or more active connections with other connectors of the plurality of electronic connectors, further limiting the first electronic connector to be operated in the device role in the second connector mode upon determining that another of the electronic connectors is being operated in the alternative connector mode.

What is claimed is:

1. An apparatus comprising:
   a separable physical connection to a second apparatus;
   a first electronic connector, the first electronic connector providing data connections for the physical connection;
   a plurality of additional electronic connectors, the plurality of additional electronic connectors being supported by the first electronic connector;
   a control logic to control operation of the plurality of additional electronic connectors, wherein the operation of the plurality of additional electronic connectors includes each electronic additional connector being capable to operate in:
   both a host role and a device role for interconnection of computing systems, wherein the host role and device role may be for a first connector mode or a second connector mode,
   and an alternative connector mode; and
   a first switch for selection of the device role for the first connector mode and a second switch for selection of the device role for the second connector mode.

2. The apparatus of claim 1, wherein only one of the plurality of additional electronic connectors may be in a device role at any time.

3. The apparatus of claim 1, further comprising a third switch for selection of either the first connector mode or the alternative connector mode.

4. The apparatus of claim 3, further comprising a first hub for the first connector mode and the second connector mode and a second hub or a fourth switch for the alternative connector mode, the first hub and second hub or fourth switch being coupled with the third switch.

5. The apparatus of claim 1, wherein the apparatus is a base portion of a detachable computing system, the second apparatus being a tablet portion of the detachable computing system.

6. The apparatus of claim 1, wherein the apparatus is a docking station, the second apparatus being a computing system that is dockable with the docking station.

7. The apparatus of claim 1, wherein the first electronic connector and each of the plurality of additional electronic connectors are USB (Universal Serial Bus) Type-C connectors.

8. The apparatus of claim 7, wherein the first connector mode is USB3 and the second connector mode is USB2.

9. The apparatus of claim 1, wherein the alternative connector mode is DisplayPort.

10. The apparatus of claim 9, wherein the alternative connector mode is either DisplayPort Alternate x2 mode plus USB3 mode or DisplayPort Alternate x4 mode.

11. A system comprising:
    a first assembly, the first assembly including:
    one or more electronic connectors, the one or more electronic connectors including a first connector, and
    a first control logic to control operation of the first connector;
    a second assembly to be connected with the first assembly, the second assembly including:
    a second electronic connector, the second electronic connector to provide data transfer between the first assembly and the second assembly,
    a plurality of additional electronic connectors, the plurality of additional electronic connectors being supported by the second electronic connector,
    a second control logic to control operation of the plurality of additional electronic connectors;
    wherein the operation of the plurality of additional electronic connectors includes each additional electronic connector being capable to operate in:

both a host role and a device role for interconnection of computing systems, wherein the host role and device role may be for a first connector mode or a second connector mode, and an alternative connector mode, and a first switch for selection of the device role for the first connector mode and a second switch for selection of the device role for the second connector mode.

12. The system of claim 11, wherein only one of the plurality of additional electronic connectors may be in a device role at any time.

13. The system of claim 11, the second assembly further including a third switch for selection of either the first connector mode or the alternative connector mode.

14. The system of claim 4, the second assembly further including a first hub for the first connector mode and the second connector mode and a second hub or a fourth switch for the alternative connector mode, the first hub and second hub or fourth switch being coupled with the third switch.

15. The system of claim 11, wherein the system comprises a detachable computing system.

16. The system of claim 11, wherein the first connector, the second electronic connector, and each of the plurality of additional electronic connectors are USB (Universal Serial Bus) Type-C connectors.

17. A non-transitory computer-readable storage medium having stored thereon data representing sequences of instructions that, when executed by a processor, cause the processor to perform operations comprising:

detecting a connection at a first electronic connector of a plurality of electronic connectors of a computing apparatus;

determining whether there are one or more active connections with other electronic connectors of the plurality of electronic connectors;

upon determining that there are no active connections with other electronic connectors of the plurality of electronic connectors, allowing the first electronic connector to be operated in any of:

a host role or a device role for interconnection of computing systems, wherein the host role and the device role may be for a first connector mode or a second connector mode, or an alternative connector mode; and upon determining that there are one or more active connections with other electronic connectors of the plurality of electronic connectors, allowing the first electronic connector to be operated in:

the host role for the interconnection of computing systems, or the device role for the interconnection of computing systems if none of the active connections for the other connectors provides the device role.

18. The medium of claim 17, wherein, upon determining that there are one or more active connections with other electronic connectors of the plurality of electronic connectors, further allowing the first electronic connector to be operated in the alternative connector mode upon determining that none of the other connectors provide the device role in the first connector mode.

19. The medium of claim 17, wherein, upon determining that there are one or more active connections with other connectors of the plurality of electronic connectors, further limiting the first electronic connector to be operated in the device role in the second connector mode upon determining that another of the electronic connectors is being operated in the alternative connector mode.

* * * * *